United States Patent
Zhang et al.

(10) Patent No.: US 10,931,399 B2
(45) Date of Patent: Feb. 23, 2021

(54) DYNAMIC ADJUSTMENT OF CCA THRESHOLD BASED ON DETERMINED VARIANCE OF CHANNEL TRANSMIT ATTEMPT FAILURE RATE RELATIVE TO EXPECTED VARIANCE ACROSS AVAILABLE TRANSMISSION CHANNELS

(71) Applicant: Cisco Technology, Inc., San Jose, CA (US)

(72) Inventors: Lele Zhang, Shanghai (CN); Huimin She, Shanghai (CN); Chuanwei Li, Shanghai (CN); Nan Yi, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 66 days.

(21) Appl. No.: 16/289,859

(22) Filed: Mar. 1, 2019

(65) Prior Publication Data
US 2020/0280391 A1    Sep. 3, 2020

(51) Int. Cl.
*G01R 31/08* (2020.01)
*G06F 11/08* (2006.01)
(Continued)

(52) U.S. Cl.
CPC ....... *H04L 1/0015* (2013.01); *H04W 74/0808* (2013.01); *H04L 12/44* (2013.01)

(58) Field of Classification Search
CPC ..... H04L 1/0015; H04L 12/44; H04L 5/0053; H04L 5/0055; H04L 5/006; H04L 1/0002;
(Continued)

(56) References Cited

U.S. PATENT DOCUMENTS

2006/0149481 A1* 7/2006 Stein ............... G06K 9/00147
702/19
2006/0253736 A1* 11/2006 Rudolf ................ H04W 52/18
714/12
(Continued)

FOREIGN PATENT DOCUMENTS

WO    2015144200 A1    10/2015

OTHER PUBLICATIONS

Cisco, "Connected Utilities—Field Area Network 2.0 Design and Implementation Guide", [online], Jan. 2016, [retrieved on Oct. 10, 2018]. Retrieved from the Internet: URL: <https://www.cisco.com/c/en/us/td/docs/solutions/Verticals/Utilities/FAN/2-0/CU-FAN-2-DIG.pdf>, 182 pages.
(Continued)

*Primary Examiner* — Stephen M D Agosta
(74) *Attorney, Agent, or Firm* — Leon R. Turkevich

(57) ABSTRACT

In one embodiment, a method comprises determining, by a network device in a wireless data network, that a prescribed Clear Channel Assessment (CCA) threshold is unsuitable for use on an identified wireless network channel among available wireless network channels, based on a determined variance of a corresponding channel transmit attempt failure rate for the identified wireless network channel, relative to an expected variance in channel transmit attempt failure rates that is determined across the respective available wireless network channels; and selectively adjusting the corresponding CCA threshold for the identified wireless network channel, until a second determined variance of the corresponding channel transmit attempt failure rate, at the identified wireless network channel, falls below a prescribed channel failure rate variance factor relative to the expected variance.

17 Claims, 6 Drawing Sheets

(51) Int. Cl.

| | | |
|---|---|---|
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04W 74/08* | (2009.01) | |
| *H04L 12/44* | (2006.01) | |

(58) Field of Classification Search
CPC ............... H04L 1/0021; H04L 1/1867; H04W 74/0808; H04W 72/082; H04W 74/006; H04W 24/08; H04W 24/10; H04W 40/244; H04W 84/12; H04B 7/18506; H04B 15/00; H04B 1/00; H04B 17/318; H04B 7/0695; H04B 7/088
See application file for complete search history.

(56) References Cited

U.S. PATENT DOCUMENTS

| | | | |
|---|---|---|---|
| 2007/0286122 A1 | 12/2007 | Fonesca | |
| 2008/0069036 A1* | 3/2008 | Lee | H04W 74/00 370/328 |
| 2013/0017794 A1 | 1/2013 | Kloper et al. | |
| 2014/0369211 A1* | 12/2014 | Pulini | H04W 84/18 370/252 |
| 2014/0369212 A1* | 12/2014 | Raravi | H04W 40/246 370/252 |
| 2016/0037537 A1 | 2/2016 | Xie | |
| 2016/0205174 A1* | 7/2016 | Pitio | H04L 67/10 709/201 |
| 2016/0227442 A1* | 8/2016 | Hao | H04W 28/22 |
| 2016/0338096 A1* | 11/2016 | Vajapeyam | H04W 72/14 |
| 2016/0353329 A1 | 12/2016 | Kakani | |
| 2017/0127449 A1* | 5/2017 | Wang | H04W 74/0816 |
| 2017/0134975 A1* | 5/2017 | Huang | H04W 24/08 |
| 2017/0332405 A1* | 11/2017 | Son | H04W 84/12 |
| 2018/0110073 A1* | 4/2018 | Mestanov | H04W 40/12 |
| 2018/0176792 A1* | 6/2018 | Egner | H04W 16/16 |
| 2018/0309479 A1* | 10/2018 | Yerramalli | H04L 5/0012 |
| 2019/0104482 A1* | 4/2019 | Wilhelmsson | H04B 17/318 |

OTHER PUBLICATIONS

Yuan et al., "Adaptive CCA for IEEE 802.15.4 Wireless Sensor Networks to Mitigate Interference", IEEE WCNC 2010 Proceedings, [online], [retrieved on Nov. 14, 2018]. Retrieved from the Internet: URL: <https://www.researchgate.net/publication/224154387_Adaptive_CCA_for_IEEE_802154_Wireless_Sensor_Networks_to_Mitigate_Interference>, 6 pages.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Wikipedia, "Branch predictor", [online], Feb. 16, 2019 [retrieved on Mar. 1, 2019]. Retrieved from the Internet: URL: <https://en.wikipedia.org/w/index.php?title=Branch_predictor&printable=yes>, pp. 1-12.

Yuan et al., "Adaptive CCA for IEEE 802.15.4 Wireless Sensor Networks to Mitigate Interference", IEEE WCNC 2010 Proceedings, [online], [retrieved on Mar. 1, 2019]. Retrieved from the Internet: URL: <https://pure.tue.nl/ws/portalfiles/portal/3068654/Metis245753.pdf>, 6 pages.

Barton et al., U.S. Appl. No. 16/195,987, filed Nov. 20, 2018.

* cited by examiner

DYNAMIC ADJUSTMENT OF CCA THRESHOLD BASED ON DETERMINED VARIANCE OF CHANNEL TRANSMIT ATTEMPT FAILURE RATE RELATIVE TO EXPECTED VARIANCE ACROSS AVAILABLE TRANSMISSION CHANNELS

TECHNICAL FIELD

The present disclosure generally relates to dynamic adjustment of a Clear Channel Assessment (CCA) threshold based on a determined variance of a channel transmit attempt failure rate, relative to an expected variance across available transmission channels.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"). Such large-scale wireless mesh networks can be used for deployment of, for example, a connected grid mesh (CG-mesh) network advanced metering infrastructure (AMI). The CG-mesh network can include thousands of IEEE 802.15.4e/g based low-power network devices (also referred to herein as Low Power and Lossy Network (LLN) devices), where each LLN network device can reach, within its transmission range, hundreds of neighboring network devices. Hence, noise and/or interference on a wireless RF channel can affect communications between LLN network devices.

Wireless link layer protocols can utilize Carrier Sense with Multiple Access with Collision Avoidance (CSMA/CA), where collisions between network devices can be avoided based on each network device executing a Clear Channel Assessment (CCA) before attempting transmission on a wireless RF channel: if the network device detects an amount of energy on a selected wireless RF channel exceeding a prescribed CCA threshold (e.g., −75 dBm), the network device can defer transmission for a random time interval ("backoff") and repeat attempting transmission by first determining whether the energy on the selected wireless RF channel is below the prescribed CCA threshold; the network device can be required to discard the packet if the number of channel access attempts reaches a prescribed number of maximum backoff attempts. A wireless network device typically uses the same prescribed CCA threshold on all its available wireless RF channels.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
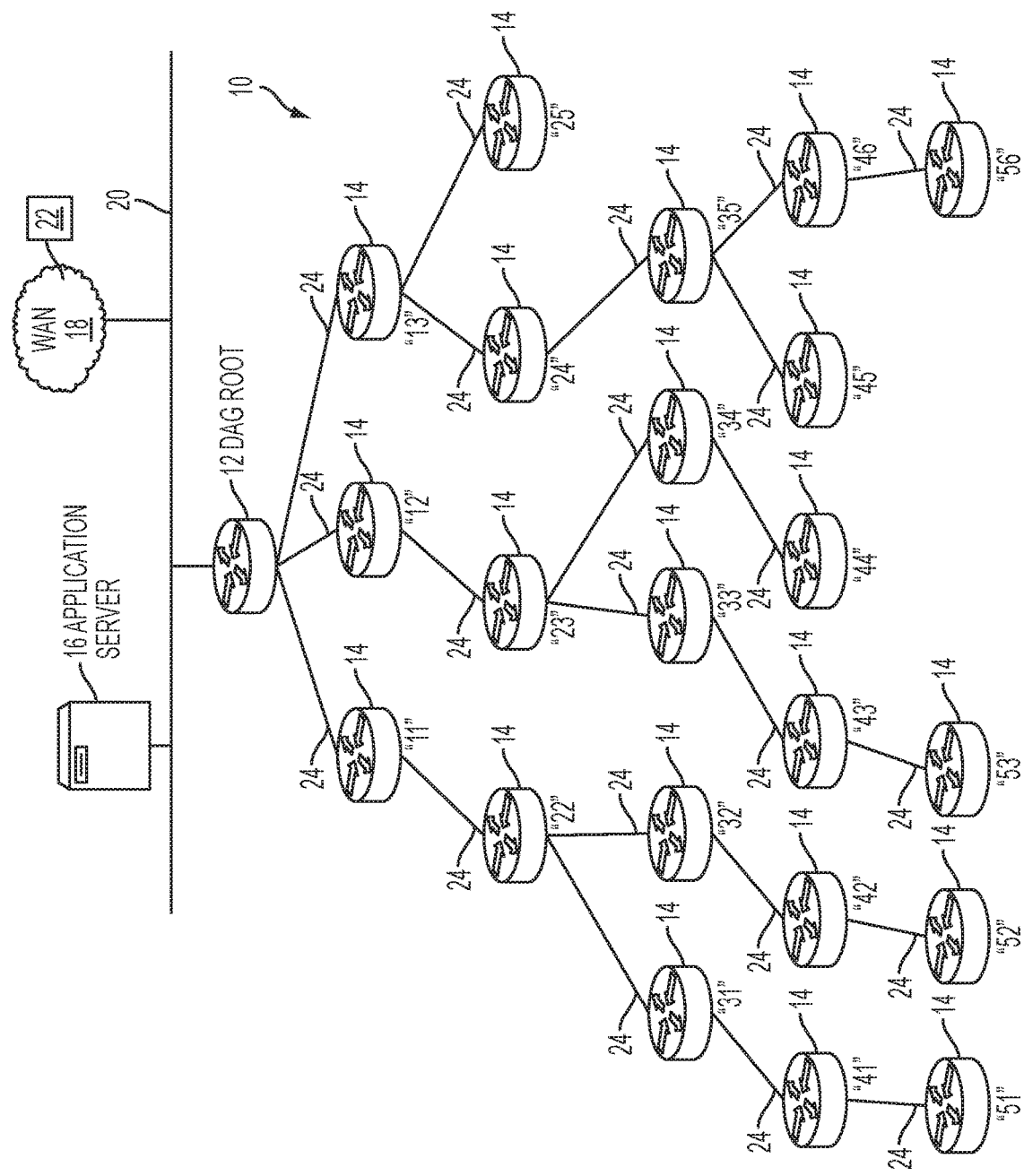
FIG. 1 illustrates an example system having an apparatus configured for dynamically adjusting of a Clear Channel Assessment (CCA) threshold based on a determined variance of a channel transmit attempt failure rate, relative to an expected variance across available transmission channels, according to an example embodiment.

In one embodiment, a method comprises determining, by a network device in a wireless data network, that a prescribed Clear Channel Assessment (CCA) threshold is unsuitable for use on an identified wireless network channel among available wireless network channels, based on a determined variance of a corresponding channel transmit attempt failure rate for the identified wireless network channel, relative to an expected variance in channel transmit attempt failure rates that is determined across the respective available wireless network channels; and selectively adjusting the corresponding CCA threshold for the identified wireless network channel, until a second determined variance of the corresponding channel transmit attempt failure rate, at the identified wireless network channel, falls below a prescribed channel failure rate variance factor relative to the expected variance.

In another embodiment, an apparatus is implemented as a physical machine. The apparatus comprises: non-transitory machine readable media configured for storing executable machine readable code; a device interface circuit configured for communications in a wireless data network; and a processor circuit. The processor circuit is configured for executing the machine readable code, and when executing the machine readable code operable for: determining that a prescribed Clear Channel Assessment (CCA) threshold is unsuitable for use on an identified wireless network channel among available wireless network channels in the wireless data network, based on a determined variance of a corresponding channel transmit attempt failure rate for the identified wireless network channel, relative to an expected variance in channel transmit attempt failure rates that is determined across the respective available wireless network channels; and selectively adjusting the corresponding CCA threshold for the identified wireless network channel, until a second determined variance of the corresponding channel transmit attempt failure rate, at the identified wireless network channel, falls below a prescribed channel failure rate variance factor relative to the expected variance.

In another embodiment, one or more non-transitory tangible media are encoded with logic for execution by a machine and when executed by the machine operable for: determining, by the machine implemented as a network device in a wireless data network, that a prescribed Clear Channel Assessment (CCA) threshold is unsuitable for use on an identified wireless network channel among available wireless network channels, based on a determined variance of a corresponding channel transmit attempt failure rate for the identified wireless network channel, relative to an expected variance in channel transmit attempt failure rates that is determined across the respective available wireless network channels; and selectively adjusting the corresponding CCA threshold for the identified wireless network channel, until a second determined variance of the corresponding channel transmit attempt failure rate, at the identified wireless network channel, falls below a prescribed channel failure rate variance factor relative to the expected variance.

DETAILED DESCRIPTION

Particular embodiments enable a network device to dynamically determine an optimized Clear Channel Assessment (CCA) threshold, for example in accordance with IEEE 802.15.4e/g wireless transmission protocols, for each and every wireless RF channel utilized by a wireless network device. The particular embodiments enable a wireless network device to adjust its CCA threshold dynamically for each wireless RF channel used by the wireless network device; the particular embodiments also enable a different network device (e.g., a network management device) to cause a wireless network device to dynamically adjust its CCA thresholds on one or more wireless RF channels, based on the network device generating and sending to the wireless network device instructions for adjusting the associated CCA thresholds in response to transmission attempt statistics reported by the wireless network device, described below.

As described in further detail below, the example embodiments can cause a wireless network device to attempt transmission of "training data" to determine whether a prescribed CCA threshold (e.g., −75 dBm) is unsuitable for use on an identified wireless network channel "i" among the available wireless network channels "k", based on a determined variance "$D(x_i)$" of a corresponding channel transmit attempt failure rate "$x_i$" for the identified wireless network channel "i", relative to an expected variance "$D(x)$" in the channel transmit attempt failure rates across the respective available wireless network channels "k". For example, an expected transmit attempt failure rate "$E(x)$" can be determined based on the transmit attempt failure rates "x" across all the available wireless network channels "k"; the variance "$D(x_i)$" for each channel transmit attempt failure rate "$x_i$" (relative to the expected transmit attempt failure rate "$E(x)$") also can be determined for each of the available wireless network channels "k"; and the expected variance "$D(x)$" in the channel transmit attempt failure rates can be determined across all the available wireless network channels "k". A CCA threshold can be deemed unsuitable for a given wireless network RF channel "i" based on a network device determining that a deviation ratio "$DI(x_i)$" (i.e., "channel failure rate variance factor") of the determined variance "$D(x_i)$" of the corresponding channel transmit attempt failure rate "$x_i$", relative to the expected variance "$D(x)$" over all the available wireless network channels "k", exceeds a prescribed channel failure rate variance factor "DI_U". The deviation ratio "$DI(x_i)$" for an identified wireless network channel "i" exceeding the prescribed channel failure rate variance factor "DI_U" can demonstrate that the determined variance "$D(x_i)$" is statistically substantially beyond the expected variance "$D(x)$" among the available wireless network channels "k".

Hence, the example embodiments can selectively adjust the CCA threshold for the identified wireless channel (e.g., "CCAi") until the selected CCA threshold "CCAi" is deemed suitable for use on the identified wireless channel "i", for example based on an updated determined variance "$D(x_i)$" of a corresponding updated channel transmit attempt failure rate "$x_i$" falling below a prescribed channel failure rate variance factor "DI_U" relative to the expected variance "$D(x)$" among the available wireless network channels "k".

Hence, the example embodiments can overcome noise energy that can have different random values at different wireless frequency channels and/or that vary dynamically at different times on the different frequency channels, with minimal computational requirements imposed on the low power and lossy network devices executing the example embodiments in a low power and lossy network such as a CG-mesh network. The example embodiments can provide scalable adjustment of CCA thresholds based on limiting adjustments to wireless network channels encountering statistically-significant failure rates (e.g., based on the deviation ratio "$DI(x_i)$" exceeding the variance rate factor "DI_U", and/or the failure rate "$x_i$" exceeding a substantially high failure rate value, e.g. "$x_i > 90\%$").

FIG. 1 illustrates an example wireless mesh data network 10, for example an IEEE 802.15.4e/g based CG-mesh network having a wireless mesh network device 12 operating as a directed acyclic graph (DAG) root for multiple wireless mesh network devices 14, operating for example as RPL nodes according to RFC 6550, according to an example embodiment. The DAG root 12 can serve as a "sink" for the mesh network devices 14, for example for reaching a server device 16 and/or a wide area network (WAN) (e.g., the Internet) 18 via a backbone link 20 (e.g., for reaching a remote network device 22 reachable via the WAN 18).

The DAG root 12 can be configured for causing creation of a tree-based topology overlying the link layer mesh data network 10 based on transmitting one or more DODAG information object (DIO) messages. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a wireless mesh network device 14 also can be referred to herein as a "RPL node" or a wireless network device. Each RPL node 14 in the LLN typically is constrained by processing power, memory, and energy (e.g., battery power); interconnecting wireless data links 24 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device (e.g., a backbone router) 12 in the form of a directed acyclic graph (DAG) toward the DAG root 12, where all routes in the LLN terminate at the DAG root 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., nodes "51", "52", "53", "44", "45", "56").

The DODAG can be formed based on a DODAG information object (DIO) advertised by the DAG root 12, where a "child" network device (e.g., "11", "12", and/or "13") 14 detecting the DIO can select the DAG root 12 as a parent in the identified DODAG based on comparing network topology metrics (advertised in the DIO) to a prescribed objective function of the RPL instance. The "child" network device 14, upon attaching to its parent, can output its own DIO with updated network topology metrics that enable other wireless mesh network devices 14 to discover the DODAG, learn the updated network topology metrics, and select a DODAG parent. As described in further detail below, the example embodiments enables any one of the network devices 12, 14, 16, and/or 22 to execute the dynamic adjustment of CCA thresholds for any one or more identified wireless network channel "i" among the available wireless network channels "k", either before, during, and/or after any network device 14 joins the wireless mesh data network 10 and/or the DODAG.

A single instance of the DODAG or DAG also is referred to as a Personal Area Network (PAN). Hence, a wireless mesh data network 10 can include a plurality of PANs (not shown in FIG. 1), where each PAN includes one DAG root 12 (exclusively allocated to the PAN) and multiple wireless mesh network devices 14 connected exclusively within the PAN according to the DIO messages originated by the corresponding one DAG root 12. Hence, unless explicitly stated otherwise herein, a wireless mesh network device 14 is configured to belong to only one PAN at a time, i.e., a wireless mesh network device 14 is configured to be attached only within one DODAG, although the wireless mesh network device 14 can be configured for attachment to one or more parent network devices 14 within a single DODAG.

Downward routes (i.e., away from the DAG root) can be created based on Destination Advertisement Object (DAO) messages that are created by a wireless mesh network device 14 and propagated toward the DAG root 12. The RPL instance can implement downward routes in the DAG of the LLN in either a storing mode only (fully stateful), or a non-storing mode only (fully source routed by the DAG root), or a combination thereof (e.g., some parent network devices operate in storing mode and one or more child network devices operate in non-storing mode only). In storing mode, a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Each mesh network device 14 in the wireless mesh data network 10 can be configured for operating in storing mode, non-storing mode, and/or a combination thereof. Hence, each wireless mesh network device 14 can unicast transmit its DAO message to its parent (and/or the DAG root 12) in accordance with RFC 6550. The DAG root 12, in response to receiving the DAO messages from the RPL nodes 14, can build the entire DAG topology and store the DAG topology in its memory circuit 34 (illustrated in FIG. 2), including storage of heuristics of usage, path length, knowledge of device capacity, link reliability, etc.

A wireless mesh network device 14 can operate as a parent network device (e.g., "22" of FIG. 1) for an attached "child" RPL node (e.g., "31"). For example, in response to a parent network device "41" receiving a data packet originated by its child network device "51" 14, the parent network device "41" can cache a downward path (i.e., away from the DAG root 12) that the target device "51" 14 is reachable via a given egress interface on the parent device "41" (e.g., output to an IPv6 address "41::51" that is the attachment address of the target device "51"); the next parent network device "31", in response to receiving the data packet from its child RPL node "41", can cache the downward path that the target device "51" 14 is reachable via the child RPL node "41"; the next parent network device "22", in response to receiving the data packet from its child RPL node "31", can cache the downward path that the target device "51" 14 is reachable via the child RPL node "31"; and the next parent network device "11", in response to receiving the data packet from its child RPL node "22", can cache the downward path that the target device "51" 14 is reachable via the child RPL node "22".

Hence, each of the parent network devices "41", "31", "22", and "11" 14 can execute a caching (e.g., a transient caching on a temporary basis) of a downward path (i.e., away from the DAG root 12) for reaching the target network device "51" 14, independent of any route table entry in the parent network device; moreover, a common parent device (e.g., "22") 14 can cache downward paths toward multiple "target devices" (e.g., network devices "51" and "52") within its sub-DAG, such that a data packet originated by one RPL node "51" and destined toward another RPL node "52" can be forwarded by the common parent device (e.g., "22") to the corresponding parent device "32" of the destination target "52" eliminating the necessity that the data packet be forwarded via the default route toward the DAG root 12.

Figure 2:
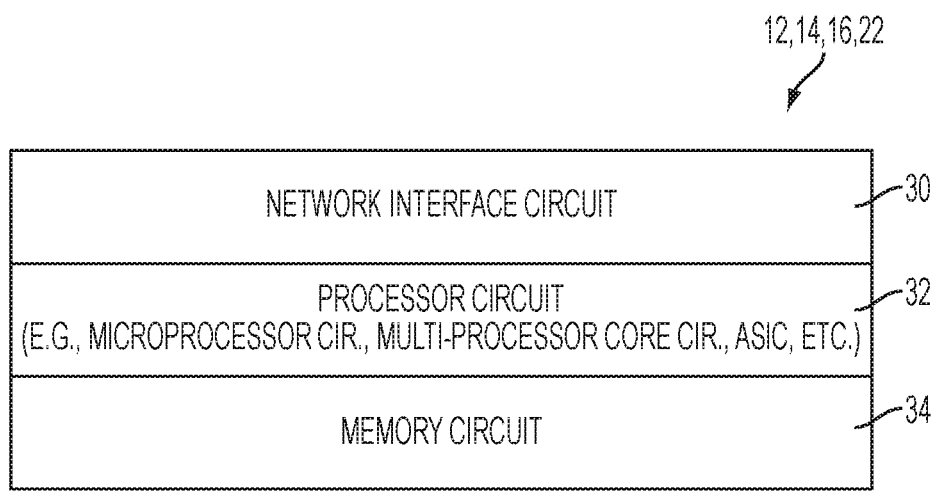
FIG. 2 illustrates an example implementation of any one of the devices of FIG. 1, according to an example embodiment.

FIG. 2 illustrates an example implementation of any one of the devices 12, 14, 16, and/or 22 of FIG. 1, according to an example embodiment. Each device 12, 14, 16, and/or 22 is a physical machine (i.e., a hardware device) configured for communications with any other device 12, 14, 16, and/or 22.

Each apparatus 12, 14, 16, and/or 22 can include a device interface circuit 30, a processor circuit 32, and a memory circuit 34. The device interface circuit 30 can include one or more distinct physical layer transceivers for communication with any one of the other devices 12, 14, 16, and/or 22; the device interface circuit 30 also can include an IEEE based Ethernet transceiver for communications with the devices of FIG. 1 via any type of data link (e.g., a wired or wireless link, an optical link, etc.), for example a wireless IEEE 802.15.4e/g data link. The processor circuit 32 can be configured for executing any of the operations described herein, and the memory circuit 34 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12, 14, 16, and/or 22 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
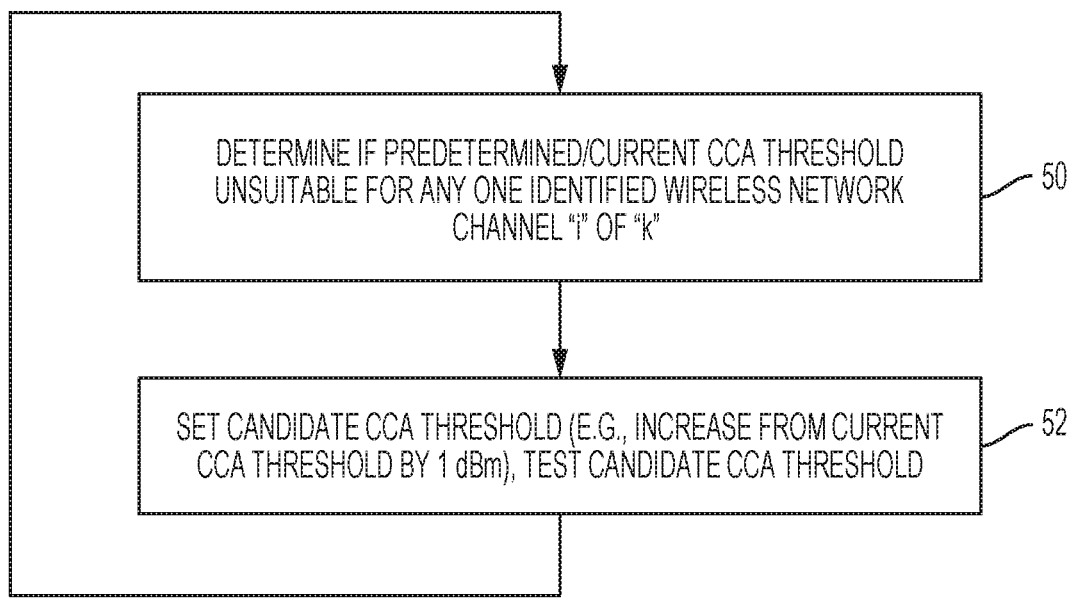
FIGS. 3A-3C illustrate an example method of an apparatus dynamically adjusting a CCA threshold based on a determined variance of a channel transmit attempt failure rate, relative to an expected variance across available transmission channels, according to an example embodiment.
Figure 3B:
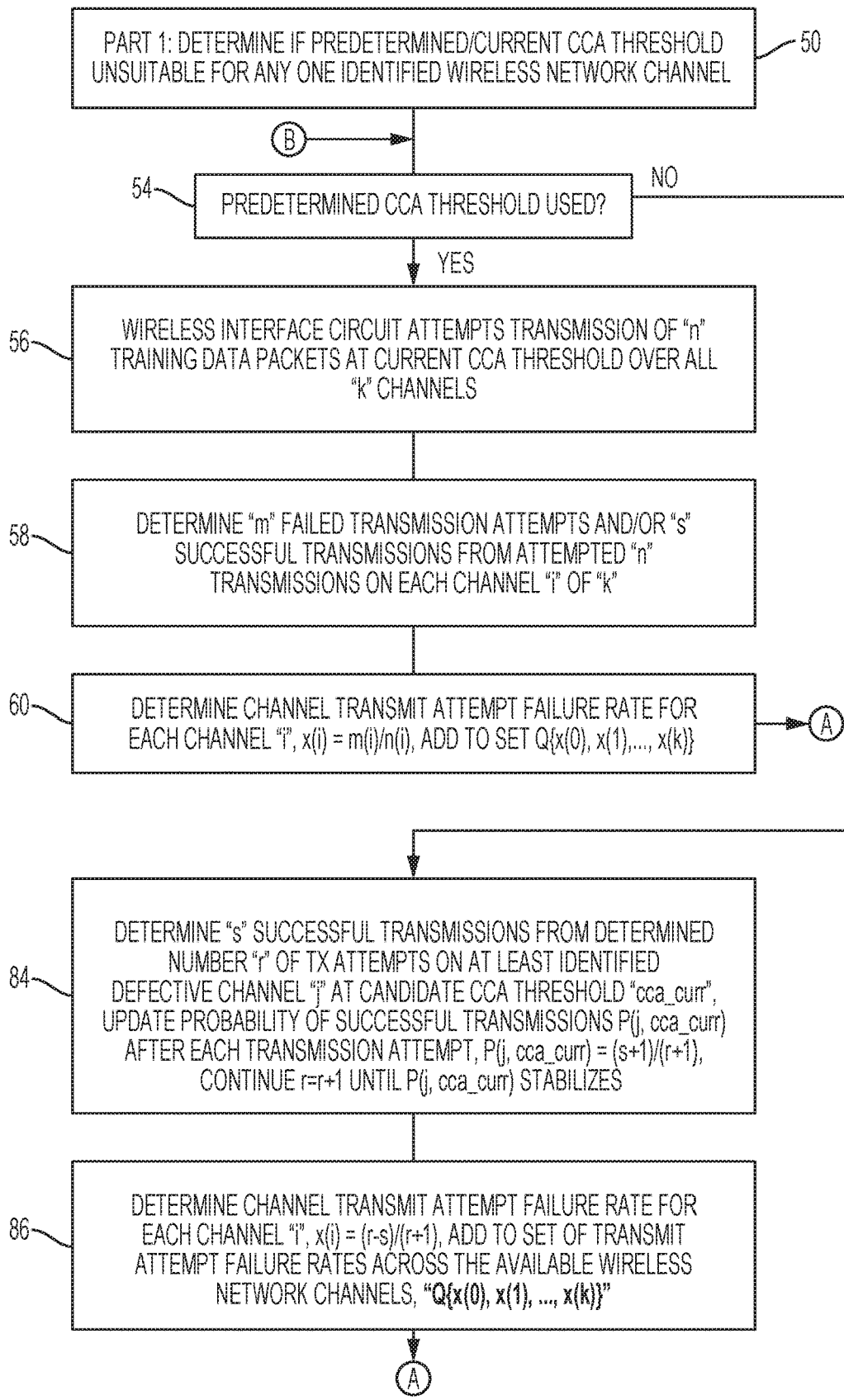
Figure 3C:
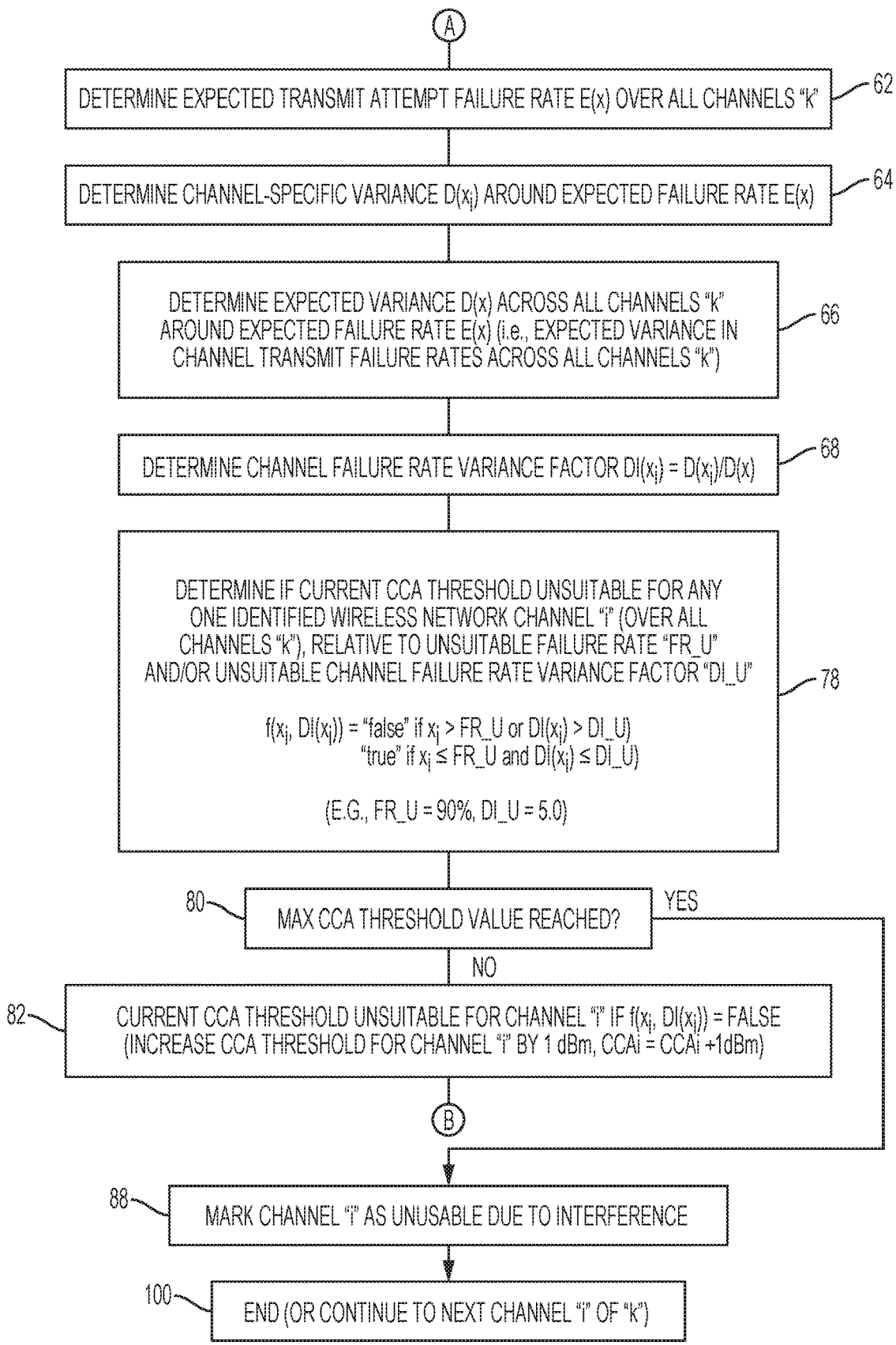

FIGS. 3A-3C illustrate an example method of an apparatus dynamically adjusting a CCA threshold based on a determined variance of a channel transmit attempt failure rate, relative to an expected variance across available transmission channels, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Figure 4:
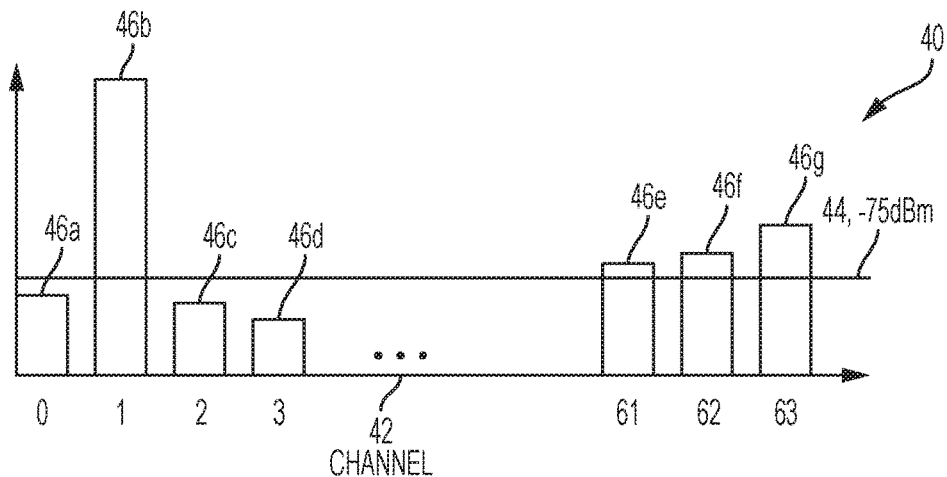
FIG. 4 illustrates an example distribution of noise across different wireless frequency channels used by the devices of FIGS. 1 and/or 2, relative to a prescribed CCA threshold, according to an example embodiment.

FIG. 4 illustrates an example distribution 40 of noise across different wireless frequency channels 42 used by one or more of the network devices of FIGS. 1 and/or 2, relative to a prescribed CCA threshold 44, according to an example embodiment. Referring to FIG. 3A, the processor circuit 32 of any one network device 12, 14, 16, and/or 22 can determine in operation 50 if a predetermined and/or current CCA threshold is unsuitable for use on any identified wireless network channel "i" from among the available wireless network channels "k". In particular, the wireless transceiver in the device interface circuit 30 of each of the wireless network devices 14 can execute energy detection (ED) within the available wireless network channels "k" in the wireless mesh data network 10: the available wireless network channels "k" in the wireless mesh data network 10 can be allocated, for example within a 2.4 GHZ Industrial, Scientific, and Medical (ISM) license-free band. The device interface circuit 30 of the DAG root 12 and each wireless network device 14 can be initially set to use a prescribed CCA threshold 44 for CSMA/CA operations on all available wireless network channels "k", for example according to IEEE 802.15.4 (e.g., IEEE 802.15.4e/g). Assume the device interface circuit 30 of the DAG root 12 and each wireless network device 14 can transmit on any one of sixty-four (64) available channels, described herein within a set "Q", where "Q=[0, 1, . . . , 63]".

The noise distribution 40 of FIG. 4 can be detected, for example, by the device interface circuit 30 of the wireless network device "12" 14 of FIG. 1. As illustrated in FIG. 4, the device interface circuit 30 of the wireless network device "12" 14 can detect the noise distribution 40 based on executing energy detection across the available channels "k" 42, and can detect in operation 50 that the channels "0", "2" and "3" 42, etc., have respective detected energy levels 46a, 46c, and 46d below the −75 dBm prescribed CCA threshold 44, and the channels "1", "61", "62", and "63" 42 have respective detected energy levels 46b, 46e, 46f, and 46g above the −75 dBm prescribed CCA threshold 44. As described in further detail below with respect to FIG. 3B, the processor circuit 32 of any network device 12, 14, 16, and/or 22 (including the wireless network device "12" 14) can determine in operation 50 that the −75 dBm prescribed CCA threshold 44 is unsuitable for use by the wireless network device "12" 14 on the channels "1", "61", "62", and "63" 42. As illustrated in FIG. 4, mere detection of the detected energy level 46 for a given wireless network channel "i" 42 is insufficient to determine whether CCA adjustment is needed, due to the invariably random fluctuations in the detected energy level 46. Hence, the example embodiments can determine the a given CCA threshold is unsuitable for use on an identified wireless network channel among available wireless network channels, based on a determined variance of a corresponding channel transmit attempt failure rate for the identified wireless network channel, relative to an expected variance in channel transmit attempt failure rates that is determined across the respective available wireless network channels As described in further detail below, the processor circuit 32 of any network device 12, 14, 16, and/or 22 in operation 52 can selectively adjust the corresponding CCA threshold for an identified wireless network channel "i" 42, for example based on increasing the corresponding CCA threshold by a prescribed amount (e.g., +1 dBm), until the adjusted CCA threshold is suitable for the identified wireless network channel "i" 42 in operation 50. In some cases where a given wireless network channel (e.g., "i=1") 42 has a substantial amount of background noise (e.g., +2 dBm) 46b caused, for example, by a nearby faulty transmitter or some other electromagnetic source, the processor circuit 32 of any network device 12, 14, 16, and/or 22 also can determine that the given wireless network channel is unusable due to interference.

FIGS. 3B and 3C illustrate in further detail the operations 50 and 52 of dynamically adjusting CCA thresholds based on a determined variance of a channel transmit attempt failure rate relative to an expected variance across the available transmission channels, according to an example embodiment.

The processor circuit 32 of any network device 12, 14, 16, and/or 22 can begin operation 50 based on determining in operation 54 whether the prescribed CCA threshold 44 is used on a current wireless network channel "i" 42 under analysis. For example, if the processor circuit 32 of the wireless network device "12" 14 (or any network device 12, 14, 16, and/or 22) determines in operation 54 that the prescribed CCA threshold 44 is used by the wireless network device "12" 14 for the wireless network channel "i=0" 42, the processor circuit 32 of the wireless network device "12" 14 (or any network device 12, 14, 16, and/or 22) in operation 56 can cause the device interface circuit 30 of the wireless network device "12" 14 to attempt transmission of a prescribed "n" number of training packets over all the available channels "k", for example based on the processor circuit 32 supplying the one or more training data packet with an instruction to attempt "n" transmissions of the training data packet over all the available channels "k". The device interface circuit 30 of the wireless network device "12" 14 can respond to the processor circuit 32 instruction in operation 56 by attempting "n" transmissions over time of the training data packet on each of the available wireless network channels "k", while maintaining count in operation 58 of the number of failed transmission attempts "n" and/or successful transmission attempts "s" for each wireless frequency channel 42, such that "n=m+s" for each wireless frequency channel 42. Hence, the device interface circuit 30 of the wireless network device "12" 14 can forward to the processor circuit 32 a data structure identifying, for each wireless network channel "i" 42, a number "n" of transmission attempts using the prescribed CCA threshold 44, and at least the number "m" of failed transmission attempts.

The processor circuit 32 of the wireless network device "12" 14 (and/or any network device 12, 14, 16, and/or 22 executing the operations on behalf of the wireless network device "12" 14) in operation 60 can determine, for each wireless network channel "i" 42, a corresponding channel transmit attempt failure rate "Pcca(i)" (also referred to as "$x_i$", i.e., "Pcca(i)=x(i)=$x_i$"), based on the processor circuit 32 implementing a division of the failed attempts "m(i)" on the wireless network channel "i" 42 by the total number of transmission attempts "n(i)", illustrated in Equation (1):

$$\rho_{cca} = \frac{m}{n} \quad (1)$$

The processor circuit 32 of the wireless network device "12" 14 (and/or any network device 12, 14, 16, and/or 22 executing the operations on behalf of the wireless network device "12" 14) in operation 60 can add the corresponding channel transmit attempt failure rate "Pcca(i)" to the set "Q" of transmit attempt failure rates over all the available channels "k" as illustrated in Equation (2):

$$Q = \{\rho_{cca}(0), \rho_{cca}(1), \ldots, \rho_{cca}(k)\} \quad (2)$$

Since "Pcca(i)" and "$x_i$" are equivalent expressions (i.e., "Pcca(i)=x(i)=$x_i$"), the set "Q" of transmit attempt failure rates as expressed in Equation (2) also can be expressed as in Equation (2-1), as illustrated in operation 60 of FIG. 3B:

$$Q = \{x(0), x(1), \ldots, X(k)\} \quad (2\text{-}1)$$

For example, the processor circuit 32 of the wireless network device "12" 14 in operation 60 can detect that channel "1" 42 has a corresponding channel transmit attempt failure rate "$x_1$" (70 of FIG. 5) of one hundred percent ("$x_1$=1.0"), for example due to a nearby interference source; the processor circuit 32 of the wireless network device "12" 14 in operation 60 can detect that the channels "61, 62, and 63" 42 each have channel transmit attempt failure rates "$x_{61}$", "$x_{62}$", and "$x_{63}$" 70 of ninety-five percent ("$x_{61}$=$x_{62}$=$x_{63}$=0.95"). The processor circuit 32 of the wireless network device "12" 14 in operation 60 also can detect the remaining wireless frequency channels 42 have channel transmit attempt failure rates "$x_i$" 70 less than seventy-five percent (75%), described below.

Referring to FIG. 3C, the processor circuit 32 of the wireless network device "12" 14 (and/or any network device 12, 14, 16, and/or 22 executing the operations on behalf of the wireless network device "12" 14) in operation 62 can determine the expected transmit attempt failure rate "E(x)" based on a summation of the transmit attempt failure rates "$x_i$" across the available wireless network channels "k" (i.e. "i=0 through k") divided by the number of channels "k", as illustrated in Equation (3):

$$E(x) = \sum_{i=1}^{k} x_i p_i \quad x_i \in Q, \; p_i = \frac{1}{k} \quad (3)$$

Hence, the processor circuit 32 of the wireless network device "12" 14 (and/or any network device 12, 14, 16, and/or 22 executing the operations on behalf of the wireless network device "12" 14) in operation 62 can determine the expected transmit attempt failure rate "E(x)" as an "expectation" (e.g., "average") of the transmit attempt failure rates "x" over all the available wireless network channels "k".

The processor circuit 32 of the wireless network device "12" 14 (and/or any network device 12, 14, 16, and/or 22 executing the operations on behalf of the wireless network device "12" 14) in operations 64 and 66 can determine the variances of the transmit attempt failure rates "$x_i$", both in terms of a channel-specific determined variance "D($x_i$)" for a corresponding wireless network channel "i" 42 (Equation 5) and an expected variance "D(x)" across the available wireless network channels "k" (Equation 4):

$$D(x) = \sum_{i=1}^{k} [x_i - E(x)]^2 p_i \quad x_i \in Q, \, p_i = \frac{1}{k} \quad (4)$$

$$D(x_i) = [x_i - E(x)]^2 \quad x_i \in Q \quad (5)$$

In particular, the processor circuit 32 of the wireless network device "12" 14 (and/or any network device 12, 14, 16, and/or 22 executing the operations on behalf of the wireless network device "12" 14) in operation 64 can execute Equation 5 and determine, for each of the available wireless network channels "k" (i.e., "i=1 through k") the corresponding variance "$D(x_i)$" of the channel transmit attempt failure rate "$x_i$" relative to the expected transmit attempt failure rate "E(x)", as the square of the difference between the channel transmit attempt failure rate "$x_i$" and the expected transmit attempt failure rate "E(x)".

The processor circuit 32 of the wireless network device "12" 14 (and/or any network device 12, 14, 16, and/or 22 executing the operations on behalf of the wireless network device "12" 14) in operation 66 can execute Equation 4 above and determine the expected variance "D(x)" as an "expectation" (e.g., "average") across all the available wireless network channels "k", based on accumulating the variances "$D(x_i)$" of the channel transmit attempt failure rates "$x_i$" across the available wireless network channels ("i=1 to k"), relative to the identified number "k" (e.g., "k=64") of the available wireless network channels.

Hence, the processor circuit 32 of the wireless network device "12" 14 (and/or any network device 12, 14, 16, and/or 22 executing the operations on behalf of the wireless network device "12" 14) in operation 68 can determine, for each wireless network channel "i" of the available wireless network channels "k", a corresponding channel failure rate variance factor (i.e., deviation ratio) "$DI(x_i)$" based on the processor circuit 32 implementing a division of the corresponding determined variance "$D(x_i)$" by the expected variance "D(x)" as illustrated in Equation 6:

$$DI(x_i) = \frac{D(x_i)}{D(x)} \quad x_i \in Q \quad (6)$$

Figure 5:
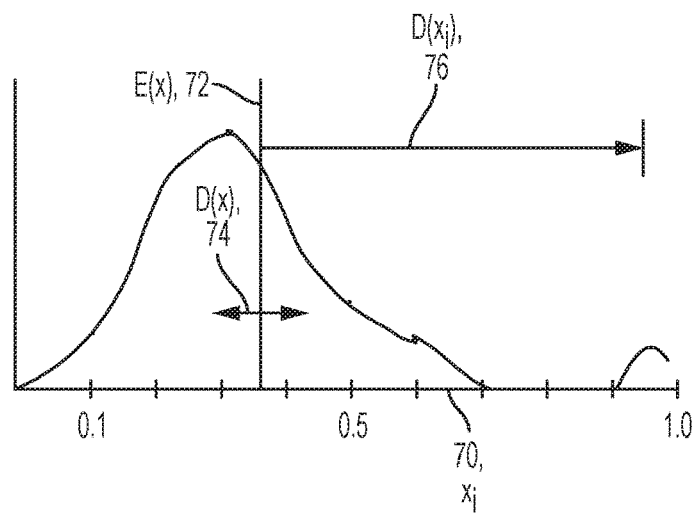
FIG. 5 illustrates an example distribution of variances in channel transmit attempt failure rates relative to available wireless frequency channels based on a prescribed CCA threshold in all the available wireless channels, according to an example embodiment.

FIG. 5 illustrates an example distribution of variances in channel transmit attempt failure rates "$x_i$" 70 relative to an expected transmit attempt failure rate "E(x)" 72 (determined in operation 62) among available wireless frequency channels "k" based on a prescribed CCA threshold 44, according to an example embodiment. FIG. 5 also illustrates an example expected variance "D(x)" 74 as determined in operation 66. As illustrated in FIG. 5, most of the wireless channels 42 have respective channel transmit attempt failure rates "$x_i$" 70 values within the range of 10 percent (10%) to seventy-five percent (75%), where only the channels "1", "61", "62", and "63" 42 have respective channel transmit attempt failure rates "$x_i$" 70 exceeding ninety percent (90%): for example, channel "1" 42 can be detected in operation 60 to have a corresponding channel transmit attempt failure rate "$x_i$" 70 of one hundred percent ("$x_i$=1.0"), for example due to a nearby interference source; the channels "61, 62, and 63" 42 each can be detected in operation 60 to have channel transmit attempt failure rate "$x_{61}$", "$x_{62}$", and "$x_{63}$" 70 of ninety-five percent ("$x_{61}=x_{62}=x_{63}=0.95$").

Hence, the processor circuit 32 of the wireless network device "12" 14 (and/or any network device 12, 14, 16, and/or 22 executing the operations on behalf of the wireless network device "12" 14) can determine in operation 64 that the wireless frequency channels "1" "61", "62", and "63" 42 each has a determined variance "$D(x_i)$" 76 that is substantially greater than the determined variance "$D(x_i)$" 76 of any of the other wireless frequency channels "0" and "2" through "60". Table 1 illustrates example values for the channel transmit attempt failure rates "$x_i$" 70, an example number ("instances") of wireless network channels "i" 42 having the corresponding channel transmit attempt failure rate "$x_i$" 70 determined in operation 60, the corresponding determined variance "$D(x_i)$" 76 determined in operation 64, and the corresponding deviation ratio "$DI(x_i)$" determined in operation 68.

TABLE 1

| "$x_i$" | # Instances | "$D(x_i)$" | "$DI(x_i)$" |
|---|---|---|---|
| 0.3 | 18 | 0.0044 | 0.1120 |
| 0.2 | 14 | 0.0277 | 0.7048 |
| 0.4 | 14 | 0.0011 | 0.0280 |
| 0.5 | 6 | 0.0178 | 0.4529 |
| 0.1 | 4 | 0.0710 | 1.8066 |
| 0.6 | 4 | 0.0546 | 1.3893 |
| 0.95 | 3 | 0.3406 | 8.6667 |
| 1.0 | 1 | 0.4014 | 10.2137 |

Based on the example values in Table 1, the processor circuit 32 of the wireless network device "12" 14 (and/or any network device 12, 14, 16, and/or 22 executing the operations on behalf of the wireless network device "12" 14) in operation 62 can determine that the expected transmit attempt failure rate "E(x)" 72 has an example value of "E(x)=0.3664", and can determine in operation 66 the expected variance "D(x)" 74 has an example value of "D(x)=0.0393", enabling the processor circuit 32 of the wireless network device "12" 14 (and/or any network device 12, 14, 16, and/or 22 executing the operations on behalf of the wireless network device "12" 14) in operation 68 to determine the channel failure rate variance factor "$DI(x_i)$" values illustrated in Table 1.

As apparent from FIG. 5 and Table 1, the processor circuit 32 of the wireless network device "12" 14 (and/or any network device 12, 14, 16, and/or 22 executing the operations on behalf of the wireless network device "12" 14) can determine that the wireless frequency channel "1" has a corresponding channel transmit attempt failure rate "$x_1$" of "$x_1=1.0$", a corresponding determined variance "$D(x_1)$" 76 of "$D(x_1)=0.4014$", and a corresponding channel failure rate variance factor "$DI(x_1)$" of "$DI(x_1)=10.2137$". The wireless frequency channels "61", "62", and "63" each have a corresponding channel transmit attempt failure rate "$x_i$" of "$x_{61}=X_{62}=X_{63}=0.95$", a corresponding determined variance "$D(x_i)$" 76 of "$D(x_{61})=D(x_{62})=D(x_{63})=0.3406$", and a corresponding channel failure rate variance factor "$DI(x_i)$" of "$DI(x_{61})=DI(x_{62})=DI(x_{63})=8.6667$".

The processor circuit 32 of the wireless network device "12" 14 (and/or any network device 12, 14, 16, and/or 22 executing the operations on behalf of the wireless network device "12" 14) in operation 78 can determine if the current CCA threshold (e.g., the prescribed CCA threshold 44) is unsuitable ("$f(x_i, DI(x_i))$=false") for an identified wireless network channel "i" (over all the channels "k") relative to an unsuitable failure rate "FR_U" (e.g., "FR_U=90%), and/or an unsuitable channel rate variance factor "DI_U" (e.g., "DI_U=5.0"), illustrated in Equation 7:

$$f(x_i, DI(x_i)) = \begin{cases} \text{false} & \text{if } (x_i > 90\% \text{ or } DI(x_i) > 5.0) \\ \text{true} & \text{if } (x_i \leq 90\% \text{ and } DI(x_i) \leq 5.0) \end{cases} \quad (7)$$

As apparent from Table 1, the processor circuit 32 of the wireless network device "12" 14 (and/or any network device 12, 14, 16, and/or 22 executing the operations on behalf of the wireless network device "12" 14) in operation 78 can determine that the prescribed CCA threshold 44 is unsuitable for the wireless network channels "1", "61", "62", and "63" ("f($x_i$, DI($x_i$))=false") based on either the channel transmit attempt failure rate "$x_i$" 70 exceeding a prescribed failure rate threshold of ninety percent (90%), or the channel failure rate variance factor "DI($x_i$)" that exceeds the prescribed channel failure rate variance factor "DI_U=5.0". In contrast, the remaining wireless frequency channels "0" and "2" through "60" can utilize the prescribed CCA threshold 44 ("f($x_i$, DI($x_i$))=true") based on the respective channel transmit attempt failure rates "$x_i$" 70 falling below ninety percent failure rate threshold (90%) and the respective channel failure rate variance factors "DI($x_i$)" below the prescribed channel failure rate variance factor "DI_U=5.0"; in other words, the remaining wireless frequency channels "0" and "2" through "60" can utilize the prescribed CCA threshold 44 because the corresponding determined variance "D($x_i$)" 76 is below the prescribed channel failure rate variance factor "DI_U=5.0" relative to the expected variance "D(x)" 74 (e.g., "D($x_i$)<5.0*D(x)", where "*" represents a multiplication operation).

Although Equation 7 and operation 78 show a "false" condition (i.e., the current CCA threshold is unsuitable) if "$x_i$>FR_U" or "DI($x_i$)>DI_U", another example embodiment by the processor circuit 32 of the wireless network device "12" 14 (and/or any network device 12, 14, 16, and/or 22 executing the operations on behalf of the wireless network device "12" 14) can ignore the channel transmit attempt failure rate "$x_i$" 70 and determine the existing CCA threshold is unsuitable based solely on the channel failure rate variance factor "DI($x_i$)" exceeding the prescribed channel failure rate variance factor "DI_U". Hence, the processor circuit 32 of the wireless network device "12" 14 (and/or any network device 12, 14, 16, and/or 22 executing the operations on behalf of the wireless network device "12" 14) can determine the prescribed CCA threshold 44 is unsuitable for use on an identified wireless network channel "i" among the available wireless network channels "k", based on the determined variance "D($x_i$)" 76 of the corresponding channel transmit attempt failure rate "$x_i$" 70 relative to the expected transmit attempt failure rate "E(x)" 72 that is determined across the respective available wireless network channels "k".

The processor circuit 32 of the wireless network device "12" 14 (and/or any network device 12, 14, 16, and/or 22 executing the operations on behalf of the wireless network device "12" 14) in operation 80 can determine, for each wireless channel "i" having been deemed using an unsuitable prescribed CCA threshold 44 ("f($x_i$, DI($x_i$))=false"), whether a maximum CCA threshold value has been reached subject to capacity limitations of the device interface circuit 30 and/or required maximum CCA threshold values specified by an administrator, regulatory constraints, link layer requirements, etc. In this first example, since each wireless channel "i" is currently using the prescribed CCA threshold 44, the processor circuit 32 of the wireless network device "12" 14 (and/or any network device 12, 14, 16, and/or 22 executing the operations on behalf of the wireless network device "12" 14) in operation 82 can selectively adjust the CCA threshold by a prescribed amount (e.g., "CCAi=CCAi+1 dBm") for each of the wireless network channels "1", "61", "62", and "63".

In response to selectively adjusting the CCA thresholds for each of the "defective" wireless network channels "1", "61", "62", and "63" to "candidate" CCA thresholds "cca_curr" in response to determining in operation 78 that the prescribed CCA threshold 44 was unsuitable, the processor circuit 32 of the wireless network device "12" 14 can cause the device interface circuit 30 to attempt transmission of the training data packets at the updated CCA thresholds.

Referring to FIG. 3B, since the prescribed CCA threshold 44 is not being used on the wireless network channels "1", "61", "62", and "63", the processor circuit 32 of the wireless network device "12" 14 in operation 84 selectively increases a number of transmission attempts "r" on each wireless network channel (e.g., "1", "61", "62", and "63") using an adjusted CCA threshold, until a determined probability "P" of successful transmissions for the identified wireless network channel reaches a stable value, as illustrated by the processor circuit 32 (or device interface circuit 30) of the wireless network device "12" 14 executing Equation 8:

$$P = \frac{s+1}{r+1} \quad (8)$$

In particular, the value "s" represents a determined number of successful transmissions (identified by the device interface circuit 30 receiving an Acknowledgement (ACK) from a neighboring wireless network device 14 (e.g., from the DAG root 12) at the beginning of transmission attempts.

As illustrated in Equation 8, the processor circuit 32 of the wireless network device "12" 14 starts operation 84 with a one hundred percent probability on each of the identified defective channels "j" ("P(j, cca_curr)=1.0"), since s=0 and r=0. There are two possible results in response to the first transmission attempt ("r=1") in operation 84: a successful transmission (detected by receipt of an ACK) causes the incrementing to "s=1" so that the probability is still equal to "1" ("P(j, cca_curr)=1.0"), indicating a 100% probability that a second packet will be successfully transmitted; the alternate result is a failed transmission attempt causing "s=0", resulting in the probability set to 50% ("P(j, cca_curr)= 0.5"), indicating a 50% probability that the second packet will be successfully transmitted.

As apparent from the foregoing, the probability value "P(j, cca_curr)" stabilizes as the number of transmission attempts "r" increases ("r=r+1") to a statistically significant number that causes the probability value "P(j, cca_curr)" to converge toward a stable value relative to the randomized noise levels 46 in the identified defective channels "j". Hence, the device interface circuit 30 continues transmission attempts ("r=r+1") until the determined probability value "P(j, cca_curr)" reaches a stable value.

The processor circuit 32 of the wireless network device "12" 14 in operation 86 determines an updated channel transmit attempt failure rate "$x_i$'" 70' for each channel "i" of the defective channels "j" using the "candidate" CCA thresholds "cca_curr". The updated channel transmit attempt failure rate "$x_i$'" 70' ("second transmit attempt failure rate") for an identified defective wireless network channel is determined by the processor circuit 32 of the wireless network device "12" 14 based on comparing the successful number of transmissions "s" at the candidate CCA threshold relative to the "second" number of attempted transmissions "r" at the candidate CCA threshold "cca_curr", illustrated in Equation 9:

$$\rho_{cca} = x_i = \frac{r-s}{r+1} \quad (9)$$

As apparent from the foregoing, the updated channel transmit attempt failure rate "$x_i$'" 70' generated by the processor circuit 32 of the wireless network device "12" 14 executing Equation 9 can result in a lower channel transmit attempt failure rate for each of the defective channels "j" based on the candidate CCA threshold "cca_curr". The updated channel transmit attempt failure rates "$x_i$'" 70' for each of the defective channels "j" are applied by the processor circuit 32 of the wireless network device "12" 14 (and/or any network device 12, 14, 16, and/or 22 executing the operations on behalf of the wireless network device "12" 14) as described previously with respect to FIG. 3C, to determine in operation whether the candidate CCA threshold "cca_curr" is suitable ("f($x_i$, DI($x_i$))=true") or unsuitable ("f($x_i$, DI($x_i$))=false") for a defective channel.

In particular, the processor circuit 32 of the wireless network device "12" 14 (and/or any network device 12, 14, 16, and/or 22 executing the operations on behalf of the wireless network device "12" 14) can determine whether the candidate CCA threshold "cca_curr" is suitable for any of the defective channels "j" based on determining the updated values for the expected transmit attempt failure rate "E(x)'" 72' (in operation 62), the updated determined variance "D($x_i$)'" 76' (in operation 64), the updated expected variance "D(x)'" 74' (in operation 66), and the updated channel failure rate variance factors "DI($x_i$)'" (in operation 68). The processor circuit 32 of the wireless network device "12" 14 (and/or any network device 12, 14, 16, and/or 22 executing the operations on behalf of the wireless network device "12" 14) can apply the updated results to determine in operation 78 whether the updated determined variance "D($x_i$)'" 76' for any of the defective channels "j" falls below the prescribed channel variance factor "DI_U=5.0", relative to the updated expected variance "D(x)'" 74' in operation 78 (e.g., "D($x_i$) '<5.0*D(x)'"). More formally, the processor circuit 32 of the wireless network device "12" 14 in operation 78 can determine whether the candidate CCA threshold "cca_curr" causes the corresponding updated channel failure rate variance factor "DI($x_i$)'" to fall below the prescribed channel failure rate variance factor "DI_U=5.0" (or whether the corresponding updated channel transmit attempt failure rate "$x_i$'" 70' is above the unsuitable failure rate "FR_U=90%").

If in operation 78 the candidate CCA threshold does not result in an updated determined variance "D($x_i$)'" 76' for a defective channel "j" falling below the prescribed channel variance factor "DI_U=5.0", relative to the updated expected variance "D(x)'" 74', the candidate CCA threshold can be selectively adjusted again in operation 82, for example by "+1 dBm", and tested again as illustrated with respect to FIG. 3B, until a suitable CCA threshold is established that ensures that the corresponding updated determined variance "D($x_i$)'" 76' falls below the prescribed channel variance factor "DI_U=5.0", relative to the updated expected variance "D(x)'" 74'.

The above-described process for selectively adjusting the corresponding CCA threshold on a "defective" channel "j" can continue until the processor circuit 32 of the wireless network device "12" 14 in operation 78 determines that the corresponding updated determined variance "D($x_i$)'" 76' falls below the prescribed channel variance factor "DI_U=5.0", relative to the updated expected variance "D(x)'" 74', or until the maximum CCA threshold is reached in operation 80.

Hence, the processor circuit 32 of the wireless network device "12" 14 can determine that the candidate CCA threshold is increased in channels "1", "61", "62", and "63" until reaching a suitable CCA threshold for channel "63" of "−72 dBm", based on determining in operation 78 the updated determined variance "D($x_{63}$)'" 76' (generated based on the CCA threshold of "−72 dBm") falls below the prescribed channel variance factor "DI_U=5.0", relative to the updated expected variance "D(x)'" 74' (that was updated based on use of the CCA threshold of "−72 dBm" on the channels "1", "61", "62", and "63").

The processor circuit 32 of the wireless network device "12" 14 also can determine via additional iterations that the candidate CCA threshold is increased in channels "1", "61", and "62 until reaching a suitable CCA threshold for channel "62" of "−71 dBm" at which point in operation 78 the updated determined variance "D($x_{62}$)'" 76' falls below the prescribed channel variance factor "DI_U=5.0", relative to the updated expected variance "D(x)'" 74'.

The processor circuit 32 of the wireless network device "12" 14 also can determine via additional iterations that the candidate CCA threshold is increased in channels "1" and "61" until reaching a suitable CCA threshold for channel "61" of "−69 dBm" at which point in operation 78 the updated determined variance "D($x_{61}$)'" 76' falls below the prescribed channel variance factor "DI_U=5.0", relative to the updated expected variance "D(x)'" 74'.

Figure 6:
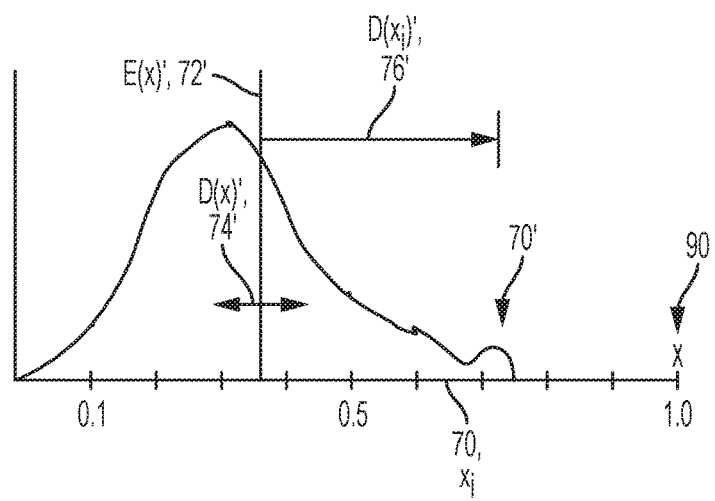
FIG. 6 illustrates an example distributions of variances in channel transmit attempt failure rates relative to available wireless frequency channels based on a dynamically-adjusted CCA threshold in one or more selected wireless channels, according to an example embodiment.

The processor circuit 32 of the wireless network device "12" 14 also can determine, after additional iterations, that a maximum threshold has been reached for the channel "1" in operation 80. The processor circuit 32 of the wireless network device "12" 14 in operation 88 can mark the channel "1" as unusable due to interference (e.g., "X" 90 in FIG. 6), and either end the dynamic adjustment of CCA thresholds in operation 100 or continue to the next channel "i" of the available wireless network channels "k" for dynamic CCA adjustment, as appropriate.

Hence, the example embodiments enable the dynamic adjustments of CCA thresholds in the wireless network device "12" 14 on a channel-specific basis, resulting in channels "0" and "2" through "60" utilizing the prescribed CCA threshold 44 "−75 dBm", channel "1" being unused due to interference, channel "61" utilizing a CCA threshold of "−69 dBm", channel "62" utilizing a CCA threshold of "−71 dBm", and the wireless network channel "63" utilizing a channel threshold of "−72 dBm".

According to example embodiments, a wireless network device can be caused to dynamically adjust its CCA thresholds, on a per-channel basis, to overcome background noise that is higher than a default CCA threshold but that does not interfere with wireless communications. The example embodiments can optimize use of available wireless network channels in an LLN, and can save on bandwidth and improve throughput in the LLN based on optimizing the link layer communications based on the dynamically adjusted CCA thresholds.

Although the example embodiments illustrated increasing CCA thresholds in multiple "defective" channels simultaneously, the example embodiments also can be implemented based on selectively adjusting the corresponding CCA threshold in an individual "defective" channel until the suitable CCA threshold has been determined as described above.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a network device in a wireless data network, that a prescribed Clear Channel Assessment (CCA) threshold is unsuitable for use on an identified wireless network channel among available wireless network channels, based on a determined variance of a corresponding channel transmit attempt failure rate for the identified wireless network channel, relative to an expected variance in channel transmit attempt failure rates that is determined across the respective available wireless network channels; and
   selectively adjusting the corresponding CCA threshold for the identified wireless network channel, until a second determined variance of the corresponding channel transmit attempt failure rate, at the identified wireless network channel, falls below a prescribed channel failure rate variance factor relative to the expected variance, wherein:
   the determining that the prescribed CCA threshold is unsuitable for use on the identified wireless network channel is further based on determining the channel transmit attempt failure rate for the identified wireless network channel exceeds a prescribed failure rate threshold;
   the selectively adjusting includes adjusting the corresponding CCA threshold for the identified wireless network channel until the second determined variance falls below the prescribed channel failure rate variance factor and the corresponding channel transmit attempt failure rate for the identified wireless network channel falls below the prescribed failure rate threshold.

2. The method of claim 1, wherein the determining of the determined variance of the channel transmit attempt failure rate for the identified wireless network channel is based on:
   determining, for each of the available wireless network channels, the corresponding transmit attempt failure rate;
   determining an expected transmit attempt failure rate based on the transmit attempt failure rates across the available wireless network channels; and
   identifying the determined variance of the channel transmit attempt failure rate for the identified wireless network channel based on the corresponding transmit attempt failure rate at the identified wireless network channel relative to the expected transmit attempt failure rate.

3. The method of claim 2, wherein the expected variance in channel transmit attempt failure rates is determined based on:
   determining, for each of the available wireless network channels, the corresponding variance of the channel transmit attempt failure rate relative to the expected transmit attempt failure rate; and
   determining the expected variance based on accumulating the variances of the channel transmit attempt failure rates across the available wireless network channels, relative to an identified number of the available wireless network channels.

4. The method of claim 1, wherein the determining that the prescribed CCA threshold is unsuitable for use on the identified wireless network channel is based on determining that a ratio of the determined variance of the corresponding channel transmit attempt failure rate, relative to the expected variance, exceeds the prescribed channel failure rate variance factor.

5. The method of claim 1, wherein:
   the determining includes determining each transmit attempt failure rate, for each wireless network channel using the prescribed CCA threshold, based on comparing a corresponding number channel transmit attempt failures to a corresponding total number of channel transmit attempts on the corresponding wireless network channel;
   the selectively adjusting including determining a second transmit attempt failure rate for the identified wireless network channel, using a candidate CCA threshold higher than the prescribed CCA threshold, based on comparing a successful number of transmissions at the candidate CCA threshold relative to a second number of attempted transmissions at the candidate CCA threshold.

6. The method of claim 5, wherein the selectively adjusting includes selectively increasing the second number of attempted transmissions at the candidate CCA threshold until a determined probability of successful transmissions for the identified wireless network channel reaches a stable value.

7. An apparatus implemented as a physical machine, the apparatus comprising:
   non-transitory machine readable media configured for storing executable machine readable code;
   a device interface circuit configured for communications in a wireless data network; and
   a processor circuit configured for executing the machine readable code, and when executing the machine readable code operable for:
   determining that a prescribed Clear Channel Assessment (CCA) threshold is unsuitable for use on an identified wireless network channel among available wireless network channels in the wireless data network, based on a determined variance of a corresponding channel transmit attempt failure rate for the identified wireless network channel, relative to an expected variance in channel transmit attempt failure rates that is determined across the respective available wireless network channels, and
   selectively adjusting the corresponding CCA threshold for the identified wireless network channel, until a second determined variance of the corresponding channel transmit attempt failure rate, at the identified wireless network channel, falls below a prescribed channel failure rate variance factor relative to the expected variance, wherein:
   the processor circuit is configured for determining that the prescribed CCA threshold is unsuitable for use on the identified wireless network channel based on determining the channel transmit attempt failure rate for the identified wireless network channel exceeds a prescribed failure rate threshold;
   the processor circuit further configured for selectively adjusting the corresponding CCA threshold for the identified wireless network channel until the processor circuit determines that the second determined variance falls below the prescribed channel failure rate variance factor and the corresponding channel transmit attempt failure rate for the identified wireless network channel falls below the prescribed failure rate threshold.

8. The apparatus of claim 7, wherein the processor circuit is configured for determining the determined variance of the channel transmit attempt failure rate for the identified wireless network channel based on:
  determining, for each of the available wireless network channels, the corresponding transmit attempt failure rate;
  determining an expected transmit attempt failure rate based on the transmit attempt failure rates across the available wireless network channels; and
  identifying the determined variance of the channel transmit attempt failure rate for the identified wireless network channel based on the corresponding transmit attempt failure rate at the identified wireless network channel relative to the expected transmit attempt failure rate.

9. The apparatus of claim 8, wherein the processor circuit is configured for determining the expected variance in channel transmit attempt failure rates based on:
  determining, for each of the available wireless network channels, the corresponding variance of the channel transmit attempt failure rate relative to the expected transmit attempt failure rate; and
  determining the expected variance based on accumulating the variances of the channel transmit attempt failure rates across the available wireless network channels, relative to an identified number of the available wireless network channels.

10. The apparatus of claim 7, wherein the processor circuit is configured for determining that the prescribed CCA threshold is unsuitable for use on the identified wireless network channel based on determining that a ratio of the determined variance of the corresponding channel transmit attempt failure rate, relative to the expected variance, exceeds the prescribed channel failure rate variance factor.

11. The apparatus of claim 7, wherein:
  the processor circuit is configured for determining each transmit attempt failure rate, for each wireless network channel using the prescribed CCA threshold, based on comparing a corresponding number channel transmit attempt failures to a corresponding total number of channel transmit attempts on the corresponding wireless network channel;
  the processor circuit is configured for selectively adjusting the corresponding CCA threshold based on determining a second transmit attempt failure rate for the identified wireless network channel, using a candidate CCA threshold higher than the prescribed CCA threshold, based on comparing a successful number of transmissions at the candidate CCA threshold relative to a second number of attempted transmissions at the candidate CCA threshold.

12. The apparatus of claim 11, wherein the processor circuit is configured for selectively increasing the second number of attempted transmissions at the candidate CCA threshold until a determined probability of successful transmissions for the identified wireless network channel reaches a stable value.

13. One or more non-transitory tangible media encoded with logic for execution by a machine and when executed by the machine operable for:
  determining, by the machine implemented as a network device in a wireless data network, that a prescribed Clear Channel Assessment (CCA) threshold is unsuitable for use on an identified wireless network channel among available wireless network channels, based on a determined variance of a corresponding channel transmit attempt failure rate for the identified wireless network channel, relative to an expected variance in channel transmit attempt failure rates that is determined across the respective available wireless network channels; and
  selectively adjusting the corresponding CCA threshold for the identified wireless network channel, until a second determined variance of the corresponding channel transmit attempt failure rate, at the identified wireless network channel, falls below a prescribed channel failure rate variance factor relative to the expected variance, wherein:
  the determining that the prescribed CCA threshold is unsuitable for use on the identified wireless network channel is further based on determining the channel transmit attempt failure rate for the identified wireless network channel exceeds a prescribed failure rate threshold;
  the selectively adjusting includes adjusting the corresponding CCA threshold for the identified wireless network channel until the second determined variance falls below the prescribed channel failure rate variance factor and the corresponding channel transmit attempt failure rate for the identified wireless network channel falls below the prescribed failure rate threshold.

14. The one or more non-transitory tangible media of claim 13, wherein the determining of the determined variance of the channel transmit attempt failure rate for the identified wireless network channel is based on:
  determining, for each of the available wireless network channels, the corresponding transmit attempt failure rate;
  determining an expected transmit attempt failure rate based on the transmit attempt failure rates across the available wireless network channels; and
  identifying the determined variance of the channel transmit attempt failure rate for the identified wireless network channel based on the corresponding transmit attempt failure rate at the identified wireless network channel relative to the expected transmit attempt failure rate.

15. The one or more non-transitory tangible media of claim 14, wherein the expected variance in channel transmit attempt failure rates is determined based on:
  determining, for each of the available wireless network channels, the corresponding variance of the channel transmit attempt failure rate relative to the expected transmit attempt failure rate; and
  determining the expected variance based on accumulating the variances of the channel transmit attempt failure rates across the available wireless network channels, relative to an identified number of the available wireless network channels.

16. The one or more non-transitory tangible media of claim 13, wherein the determining that the prescribed CCA threshold is unsuitable for use on the identified wireless network channel is based on determining that a ratio of the determined variance of the corresponding channel transmit attempt failure rate, relative to the expected variance, exceeds the prescribed channel failure rate variance factor.

17. The one or more non-transitory tangible media of claim 13, wherein:
- the determining includes determining each transmit attempt failure rate, for each wireless network channel using the prescribed CCA threshold, based on comparing a corresponding number channel transmit attempt failures to a corresponding total number of channel transmit attempts on the corresponding wireless network channel;
- the selectively adjusting including determining a second transmit attempt failure rate for the identified wireless network channel, using a candidate CCA threshold higher than the prescribed CCA threshold, based on comparing a successful number of transmissions at the candidate CCA threshold relative to a second number of attempted transmissions at the candidate CCA threshold.

\* \* \* \* \*